(12) United States Patent
Bruennert et al.

(10) Patent No.: US 8,144,755 B2
(45) Date of Patent: Mar. 27, 2012

(54) METHOD AND APPARATUS FOR DETERMINING A SKEW

(76) Inventors: Michael Bruennert, Munich (DE); Christoph Bilger, Munich (DE); Peter Gregorius, Munich (DE); Maurizio Skerlj, Munich (DE); Wolfgang Walthes, Munich (DE); Johannes Stecker, Munich (DE); Hermann Ruckerbauer, Moos (DE); Dirk Scheideler, Munich (DE); Roland Barth, Munich (DE)

( * ) Notice: Subject to any disclaimer, the term of this patent is extended or adjusted under 35 U.S.C. 154(b) by 1146 days.

(21) Appl. No.: 11/947,339

(22) Filed: Nov. 29, 2007

(65) Prior Publication Data

US 2009/0141843 A1    Jun. 4, 2009

(51) Int. Cl.
*H04B 3/46* (2006.01)
(52) U.S. Cl. ........ 375/226; 375/316; 375/340; 375/342; 375/371; 714/699; 714/700; 713/500; 713/503
(58) Field of Classification Search ................. 375/226, 375/316, 340, 342, 371; 714/699–700; 713/500, 713/503
See application file for complete search history.

(56) References Cited

U.S. PATENT DOCUMENTS

| | | | |
|---|---|---|---|
| 6,704,890 B1 * | 3/2004 | Carotti et al. | 714/700 |
| 7,036,037 B1 * | 4/2006 | Paul et al. | 713/401 |
| 7,275,173 B2 * | 9/2007 | Lindt | 713/500 |

\* cited by examiner

*Primary Examiner* — Chieh M Fan
*Assistant Examiner* — Sophia Vlahos
(74) *Attorney, Agent, or Firm* — Murphy, Bilak & Homiller, PLLC

(57) ABSTRACT

The invention provides a method and an apparatus for determining a skew of each data bit of an encoded data word received by a receiver via an interface from a transmitter comprising the steps of performing an error check and correction of the received and sampled encoded data word to calculate an error corrected encoded data word corresponding to the encoded data word transmitted by the transmitter, and correlating a sequence of error corrected encoded data words with the sampled encoded data words to determine a skew of each data bit of said received encoded data words.

22 Claims, 11 Drawing Sheets

Sampling time instants at receiver

Sampling time instants at receiver

Sampling time instants at receiver

Sampling time instants at receiver

METHOD AND APPARATUS FOR DETERMINING A SKEW

The invention relates to a method and an apparatus for determining a skew of data bits received by a receiver via an interface from a transmitter.

TECHNICAL BACKGROUND

A skew is in parallel data transmission the difference in arrival time of data bits transmitted at the same time. The skew between single data lines of a parallel interface, for example of DRAM memory chips, is an obstacle for increasing the data transfer rate.

FIG. 1A shows an ideal case of data bits received by the receiver via a parallel interface, wherein all data bits are perfectly aligned in time. As can be seen from FIG. 1A, there is in a data period a time margin for correctly sampling the data bits in parallel in one time instant.

As can be seen from FIG. 1B, when a skew occurs during data transfer within the time margin for directly sampling all data bits in parallel in one time instant is reduced until no common sampling point for all data bits can be determined anymore as shown in FIG. 1C. In the given example, data bit 1 shows an increased skew and data bit n shows a negative skew with respect to data bit 0. In the situation as shown in FIG. 1C, a skew related transmission failure occurs on the receiving side. If the skew becomes even bigger, this can lead to a sampling of false data bits due to the skew as shown in FIG. 1D. As can be seen from FIG. 1D, data bit 1 is too late, whereas data bit 2 is too early with respect to the correct sampling time at the receiver. As data transfer rates increase, word duration and margin decrease limiting the maximum amount of allowed skew. The skew can be generated by a static effect like trace length differences or mismatch in circuits which are constant during operation time of the system as well as dynamic effects like temporary supply voltage variations, temperature drift and clock jitter which change skew during operation of the system.

It is an object of the present invention to provide a method and an apparatus for determining a skew of data bits received by a receiver via an interface from a transmitter.

SUMMARY OF THE INVENTION

The invention provides a method for determining a skew of each data bit of a stream of encoded data words received by a receiver via a parallel interface from a transmitter comprising the steps of:
performing an error check and correction for each received and sampled encoded data word to calculate an error corrected encoded data word corresponding to the encoded data word transmitted by the transmitter; and
correlating the received sampled encoded data word with error corrected encoded data words of current, previous and subsequent data transmissions to determine a skew of each data bit of said received encoded data word stream.

In an embodiment of the method according to the present invention, the determined skew is filtered.

In a further embodiment of the method according to the present invention, each bit of the received encoded data word is sampled by a sampling means clocked by a clock signal.

In an embodiment of the method according to the present invention, the sampling means is formed by a flip-flop.

In an embodiment of the method according to the present invention, a clock signal which is applied to sampling means for sampling a bit of the received encoded data word is phase shifted depending on the filtered skew determined for the respective bit.

In an embodiment of the method according to the present invention, each bit of the received encoded data word is delayed depending on the filtered skew determined for the respective bit.

In an embodiment of the method according to the present invention, the transfer rate at which the encoded data words are transferred from said transmitter via the interface to the receiver is adapted depending on the determined skew.

In an embodiment of the method according to the present invention, the transfer rate is increased such that the determined skew is tolerable.

In an embodiment of the method according to the present invention, the interface is formed by a parallel interface.

In an embodiment of the method according to the present invention, the interface is a wired interface comprising a signal line for each data bit of the encoded data word.

In an embodiment of the method according to the present invention, the interface is formed by a wireless or wired interface comprising a signal channel for each data bit of the encoded data word.

The invention further provides an apparatus for determining a skew of each data bit of a stream of encoded data words received via a parallel interface comprising:
a sampling unit for sampling the received encoded data words,
an error check and correction unit for calculating an error corrected encoded data word for each received encoded data word,
a correlation unit for correlating each received sampled encoded data word supplied by said sampling unit with error corrected encoded data words of current, previous and subsequent data transmissions to determine a skew for each data bit of the received encoded data word stream.

In an embodiment of the apparatus according to the present invention, the sampling unit comprises a register having a clocked sampling circuit each provided for sampling a data bit of the received encoded data word.

In an embodiment of the apparatus according to the present invention, a filter is provided for filtering the determined skew of each data bit of the received stream of encoded data words.

In an embodiment of the apparatus according to the present invention, the apparatus comprises skew compensation units each provided for phase shifting a clock signal for a sampling means of said sampling unit provided for sampling a data bit of the received encoded data word depending on a skew determined by said correlation unit for the respective data bit.

In an embodiment of the apparatus according to the present invention, the sampling means are formed by a flip-flop.

In an embodiment of the apparatus according to the present invention, the phase shifting is performed by a delay element, a delay locked loop or a phase interpolator.

In an embodiment of the apparatus according to the present invention, the apparatus comprises skew compensation units each provided for phase shifting a data bit of the received encoded data word depending on a skew determined by the correlation unit for the respective data bit.

In an embodiment of the apparatus according to the present invention, if the shifted bit sequence of the data bit of the sampled encoded data word matches the unshifted bit sequence of the corrected encoded data word, it is decided that a skew error has occurred.

In an embodiment of the apparatus according to the present invention, the correlation unit determines the skew to be equal to the applied shift if a skew error is detected.

A skew correction by performing clock/data delays or phase shifting can be provided in a memory chip, a memory controller or a receiver.

The invention further provides a receiver comprising:
an error check and correction unit for calculating error corrected encoded data words on the basis of sampled encoded data words received by the receiver, and
a correlation unit for correlating a time sequence of error corrected encoded data words with the sampled encoded data words to determine a skew for each data bit of said received encoded data words.

The invention further provides a memory controller comprising:
an error check and correction unit for calculating error corrected encoded data words on the basis of sampled encoded data words received by said memory controller, and
a correlation unit for correlating a time sequence of error corrected encoded data words with the sampled encoded data words to determine a skew for each data bit of said received encoded data words.

The invention further provides a memory chip comprising:
an error check and correction unit for calculating error corrected encoded data words on the basis of sampled encoded data words received by said memory chip, and
a correlation unit for correlating a time sequence of error corrected encoded data words with the sampled encoded data words to determine a skew for each data bit of said received encoded data words.

Figure 1A:
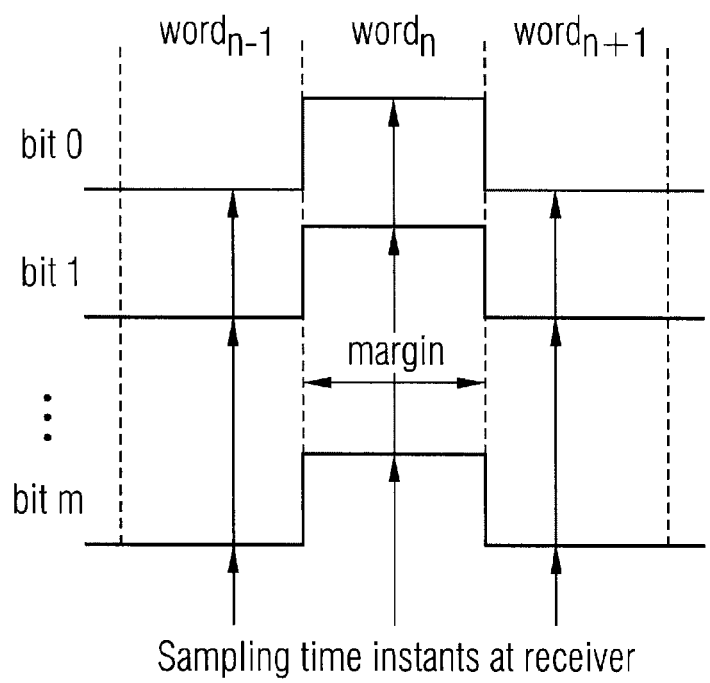
FIGS. 1A to 1D show signal diagrams for illustrating consequences for data transmission skews on a parallel data transfer interface.
Figure 1B:
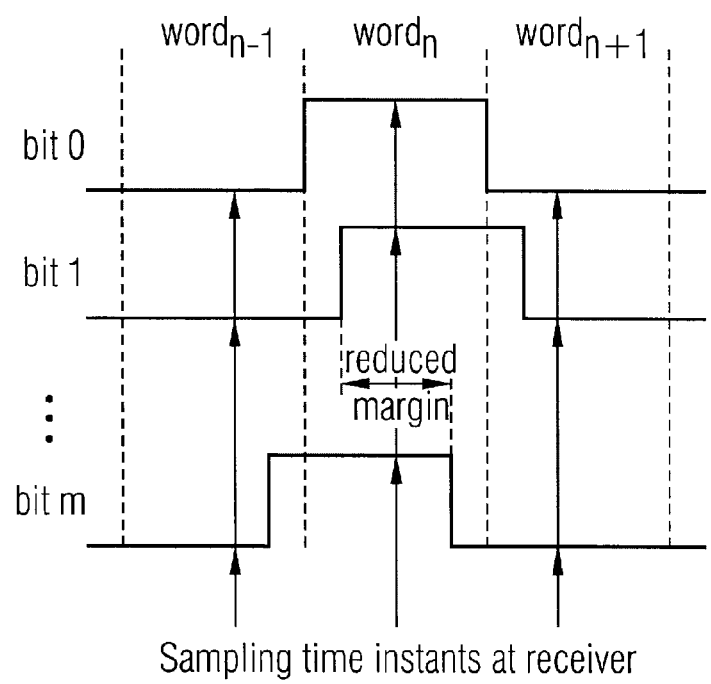
Figure 1C:
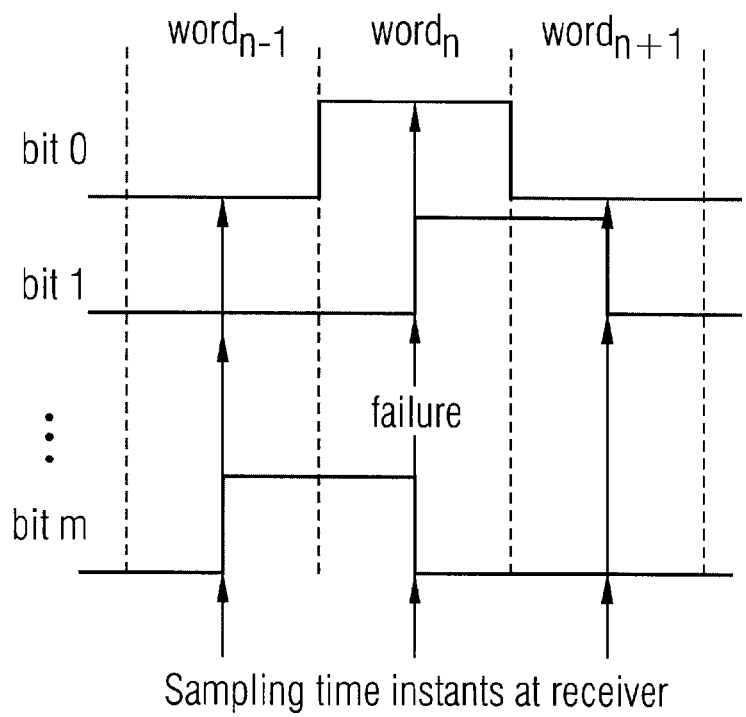
Figure 1D:
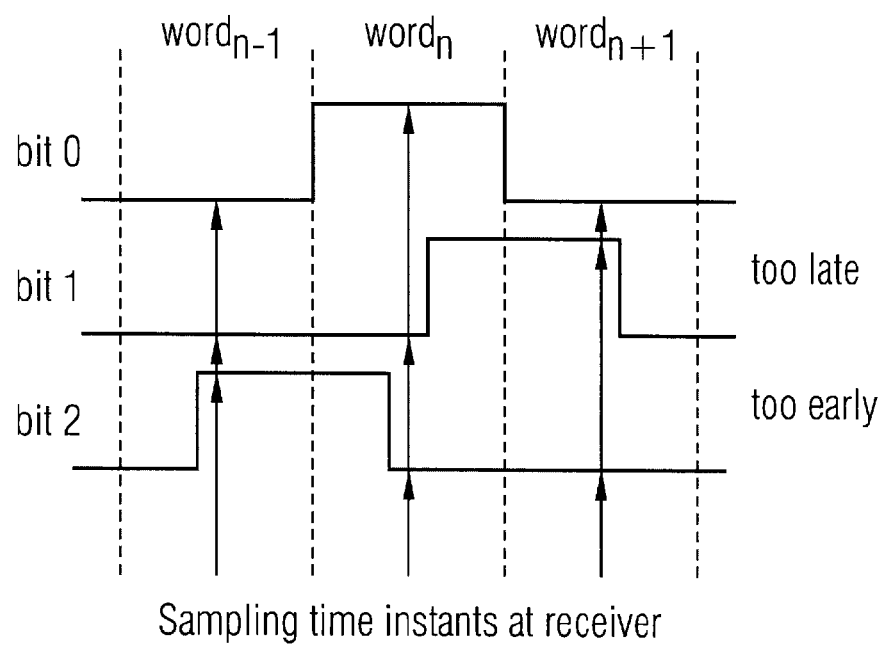
Figure 2:
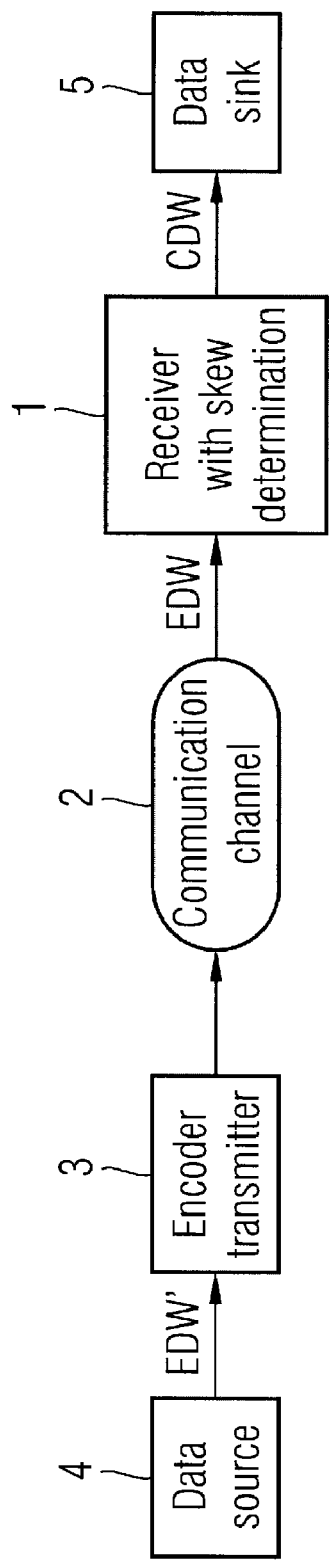
FIG. 2 shows a block diagram of a communication system comprising a receiver with a skew correction as an embodiment of the present invention.

As can be seen from FIG. 2, the receiver 1 comprising a skew determination and correction unit receives an encoded data word EDW via a communication channel 2 from a transmitter 3 including an encoder. The data word DW is supplied from a data source 4 to the transmitter 3 and having an encoder to encode the data word DW. During transmission via the communication channel 2, the different data bits of the encoded data word EDW can be affected by a skew with respect to each other. The receiver 1 as shown in FIG. 2 determines the skew of all data bits received via the communication channel 2. Further, the receiver 1 compensates the determined skew and outputs a skew corrected data word to a data sink 5, such as a processor.

Figure 3:
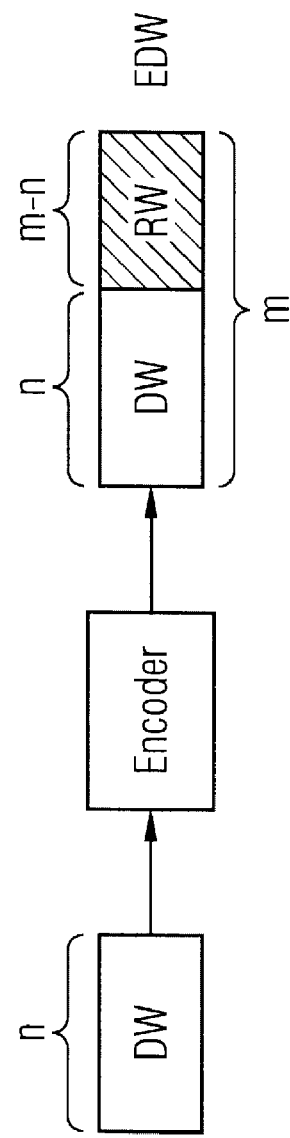
FIG. 3 shows a diagram for illustrating encoding of a data word to generate an encoded data word as used by the method and apparatus according to the present invention.

FIG. 3 shows a diagram for illustrating an encoding of a data word DW on the transmitting side. The data word DW comprises n bits and is encoded to generate an m bit encoded data word EDW comprising n bits of the original data word DW and further (m−n) redundant bits.

In the given example, the data word comprises n bits, e.g. n bits of the original data word DW and (m−n) bits of the redundant data words RDW. FIG. 3 shows only an example of a possible encoding scheme. The apparatus and method according to the present invention can determine a skew of data bits for an encoded data word which is encoded according to other encoding schemes as well. The method and apparatus according to the present invention can handle data words which are encoded in different encoding algorithms.

Figure 4:
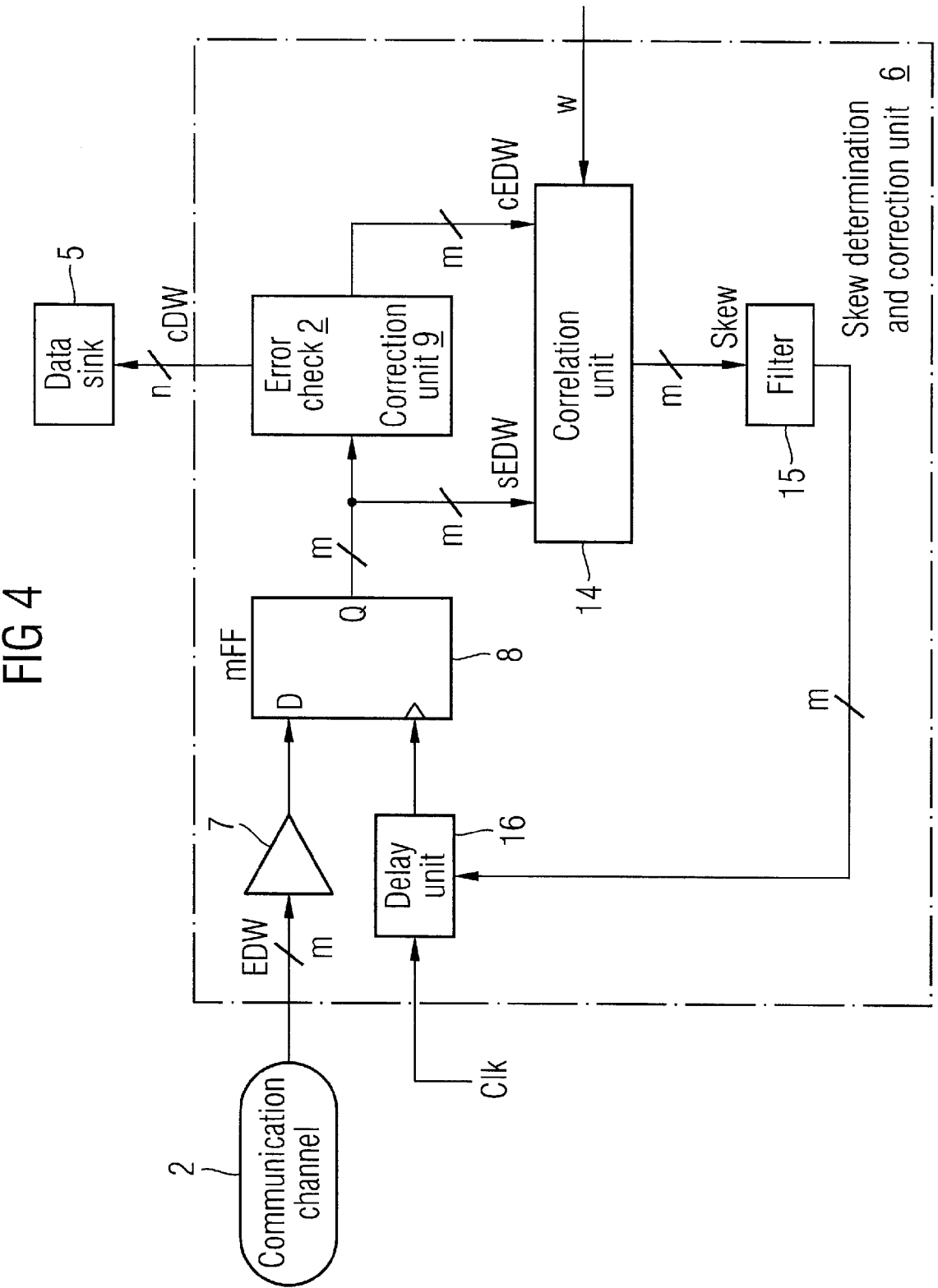
FIG. 4 shows a block diagram of a possible embodiment of the apparatus according to the present invention.

FIG. 4 shows a block diagram of a possible embodiment of a skew determination and correction unit 6 within a receiver 1 as shown in FIG. 2. The skew determination correction unit 6 receives an encoded data word EDW from the communication channel 2. In a possible embodiment, the communication channel 2 is formed by a parallel interface comprising a signal line for each data bit of the encoded data word EDW. In another embodiment, the communication channel 2 is formed by a wired or wireless interface comprising a signal channel for each data bit of the encoded data word EDW. For example, the communication channel 2 can comprise m OFDM-channels provided for m data bits of the encoded data word. The OFDM-data transmission channels are, for instance employed in wireless WLAN-systems or in wired xDSL-systems. The encoded data word EDW is generated, for example by an ECC-encoder within the transmitter 3. Other possible encoding schemes include convolution codes, turbo-codes and BCH codes. Any error correcting code (ECC) can be used. The received encoded data word EDW is amplified by a signal amplifier 7 and applied to a sampling unit for sampling the received encoded data word EDW. The sampling unit comprises a register having clocked register flip-flops 8 which are provided for sampling a corresponding bit of the received encoded data word. As shown in FIG. 4, the skew determination and correction unit 6 comprises m D-flip-flops 8 each provided for a data bit of the received and encoded data word EDW. The sampled encoded data word sEDW is supplied by the sampling unit to a clocked error check and correction unit 9. The error check and correction unit 9 is shown in more detail in FIG. 5 as an implementation of a decoder provided for ECC codes. The sampled encoded data word EDW is supplied to the error check and correction unit 9 comprising a syndrome decoder 10 to determine which of the encoded data bits comprises an error. The syndrome decoder 10 of the error check and correction unit 9 is connected to EXOR-gates 11, 12 for inverting each data bit which has a data bit error. In the embodiment shown in FIG. 5, the error check and correction unit 9 comprises n EXOR-gates 11 and n−m EXOR-gates 12. The corrected data word CDW output by the n EXOR gates 11 is supplied to the data sink 5 which can be formed by a central processing unit CPU. The corrected redundant word cRW output by the n−m EXOR-gates 12 and the corrected data word cDW are supplied as the corrected encoded data word cEDW consisting of the corrected data word cDW and the corrected redundant word cRW to the correlation unit 14.

Figure 5:
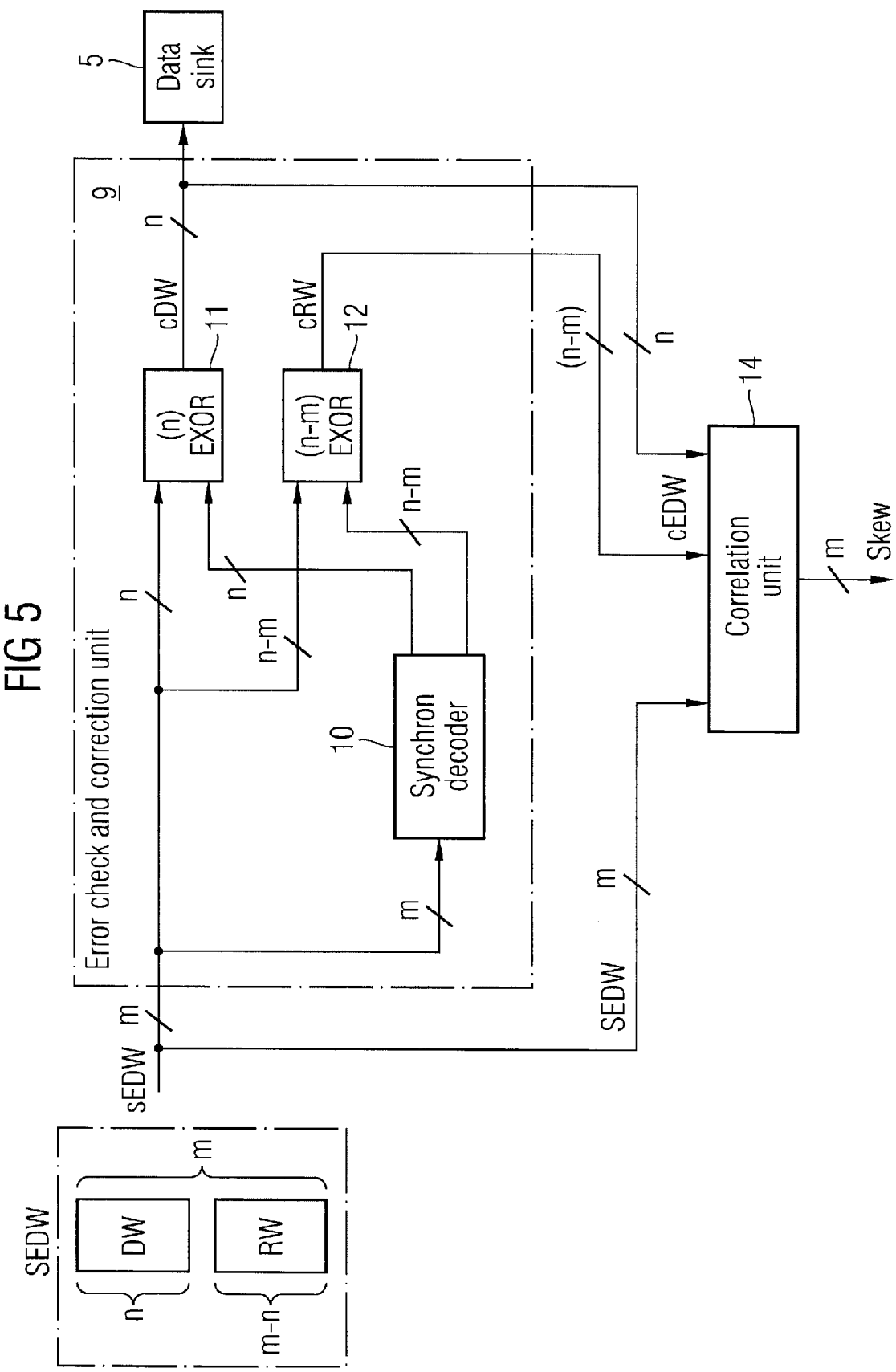
FIG. 5 shows an error check and correction unit provided in an embodiment of the apparatus according to the present invention in more detail.

As shown in FIGS. 4, 5 the sampled encoded data words sEDW and the corrected encoded data word cEDW are both applied to a correlation unit 14 within the skew determination and correction unit 6. The error check and correction unit 9 performs an error check and correction of the received and sampled encoded data word sEDW to calculate the error corrected encoded data word cEDW corresponding to the encoded data word EDW transmitted by the transmitter 3. The correlation unit 14 then correlates a sequence of sampled encoded data words sEDWs with a corresponding sequence of corrected encoded data words cEDWs to determine a skew of each data bit of the received encoded data word EDW. In a possible embodiment, the correlation unit 14 shifts for each data bit of the sampled encoded data word sEDW with respect to received bit sequences of this data bit, e.g. w data bits with respect to a bit sequence of the corresponding data bit of the corrected encoded data word cEDW. If the shifted bit sequence of a data bit of the sampled encoded data word sEDW matches the corresponding unshifted bit sequence of the data bit of the corrected encoded data word cEDW, the correlation unit 14 decides that a skew error and not a normal bit error has occurred. If a skew error is detected by the correlation unit 14 it is determined that the occurred skew is equal to the shift applied by the correlation unit 14. The correlation unit 14 calculates a skew for each of the m data bits of the encoded data word EDW received via the communication channel 2. The determined skew is filtered by a filter 15 to determine an error skew for each data bit $b_i$. The filtered skew of each data bit forms a control signal for a corresponding skew compensation phase shifting unit 16 as shown in FIG. 4. In the embodiment of FIG. 4, the skew compensation phase shifting unit 16 tunes a phase of a clock signal CLK and outputs the phase shifted clock signal to a clock input of a corresponding D-flip-flop 8 of the sampling unit. The skew compensation delay unit 16 is provided for each data bit of the encoded data word EDW. The skew compensation phase shifting unit 16 shifts the phase of the clock signal CLK depending on the filtered skew determined by the correlation unit 14 for the respective data bit.

Figure 6:
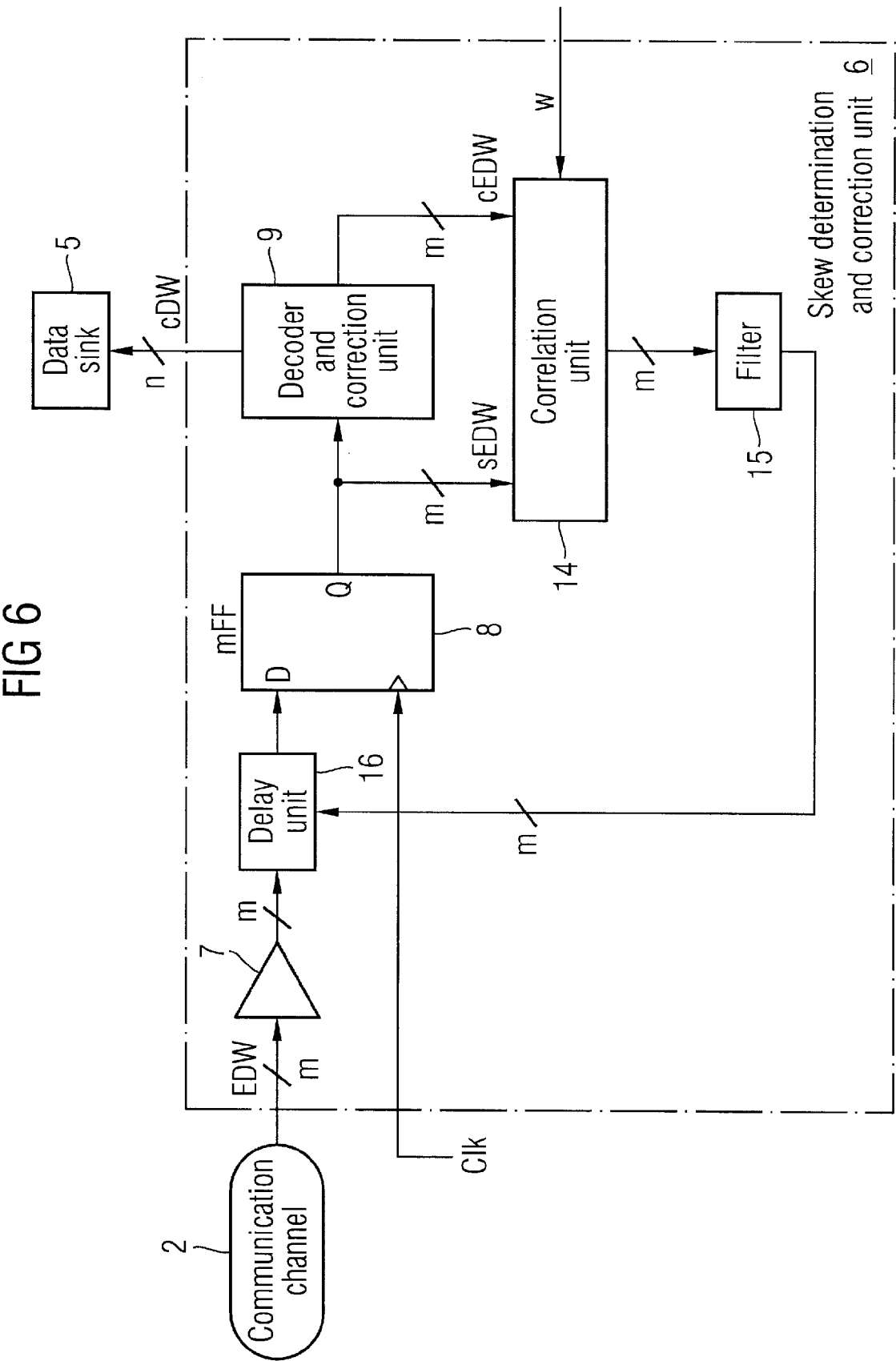
FIG. 6 shows a block diagram of a further embodiment of the apparatus according to the present invention.

FIG. 6 shows an alternative embodiment of a skew determination and correction unit 6. In the shown embodiment, the skew compensation phase shifting unit 16 is provided in the data signal path and delays the data bit of the received encoded data word EDW depending on the filtered skew determined by the correlation unit 14 for the respective data bit. The skew compensation unit 16 comprises a delay unit for each data bit.

Figure 7:
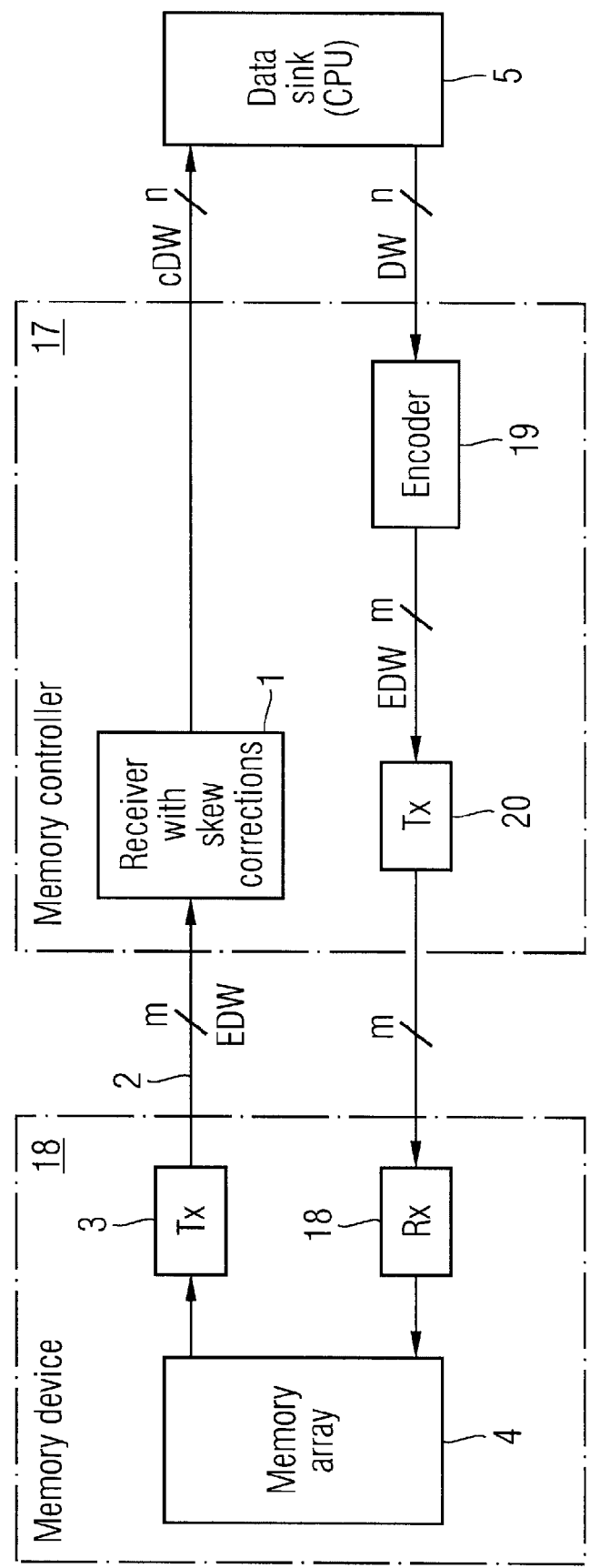
FIG. 7 shows a block diagram of a memory system having a memory controller comprising a skew determination and correction unit according to a possible embodiment of the present invention.

FIG. 7 shows a possible embodiment of a memory system comprising a memory controller having a receiver with an integrated skew determination and correction unit 6. In the given example, the data sink 5 is formed by a CPU connected to a memory controller 17. The data source is formed by a memory array 4 of a memory device 18, such as a memory chip 18. The memory device comprises a transmitter 3 transmitting the encoded data word EDW via m signal lines of a parallel interface via the communication channel 2 to the receiver 1 within the memory controller 17. The decoded and corrected data word cDW is output by the receiver 1 of the memory controller 17 to the central processing unit 5 as shown in FIG. 7. The corrected data word cDW comprises n data bits. In a possible embodiment, the memory controller 17 further comprises an encoder 19 for encoding a data word DW received from the central processing unit 5. The encoded data word is transmitted by a transmitting unit 20 via a parallel interface 2 to the receiving unit 21 of the memory device 18. The parallel interface 2 transfers in a possible embodiment a data word of the memory system shown in FIG. 7. The encoded data word EDW received by the memory 18 from the memory controller 17 is written into a memory array 4 of the memory device 18. On demand, the encoded data word EDW is transmitted to the memory controller 17. An integrated skew determination and correction unit 6 with a receiver 1 performs a skew determination and a skew compensation.

In a possible embodiment, a skew of a data bit is only determined but not compensated. In a possible embodiment, if a skew is determined the transfer rate at which the encoded data word EDW is transferred from the transmitter 3 via a communication channel 2 to the receiver 1 is adapted depending on the determined skew. In a possible embodiment, for example in an error and power constrained system, the link data transfer rate is increased to a tolerable skew range to fit the maximum determined skew.

Figures 8A, 8B:
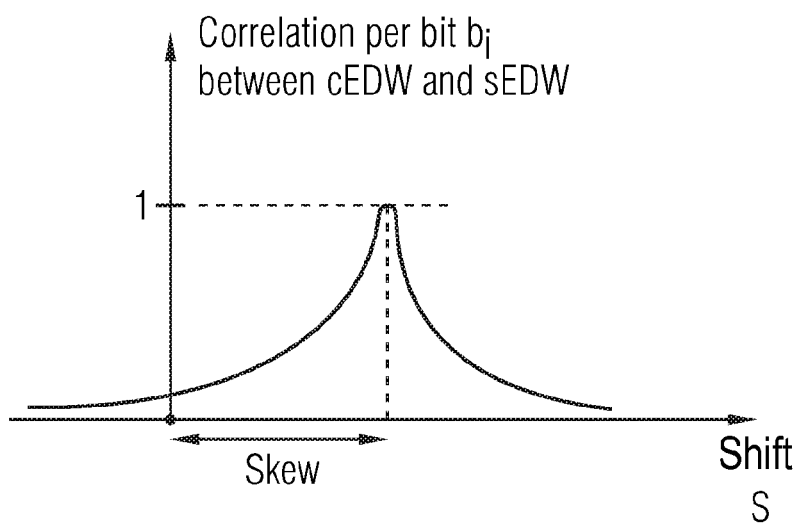
FIG. 8A shows an example of shifted bit sequences of a data bit as applied in a possible embodiment of the method and apparatus according to the present invention.
FIG. 8B shows a diagram for illustrating the functionality of an embodiment of the method and apparatus according to the present invention.

FIG. 8A shows a diagram for illustrating a skew determination. The encoded data word EDW is transmitted from a transmitter 3 to a receiver 1 and sampled within the receiver 1 as the sampled encoded data word sEDW as shown in FIG. 8A. If the skew becomes too high, sampling without skew determination correction will lead to errors.

FIG. 8B shows a correlation value C per bit $b_i$ between the corrected encoded data word cEW and the sampled encoded data word sEDW depending on a shift applied to the sampled encoded data word sEDW by the correlation unit 14. If the shifted bit sequence matches the unshifted bit sequence, the correlation value C approaches a maximum amount indicating a skew of this data bit.

Figure 9:
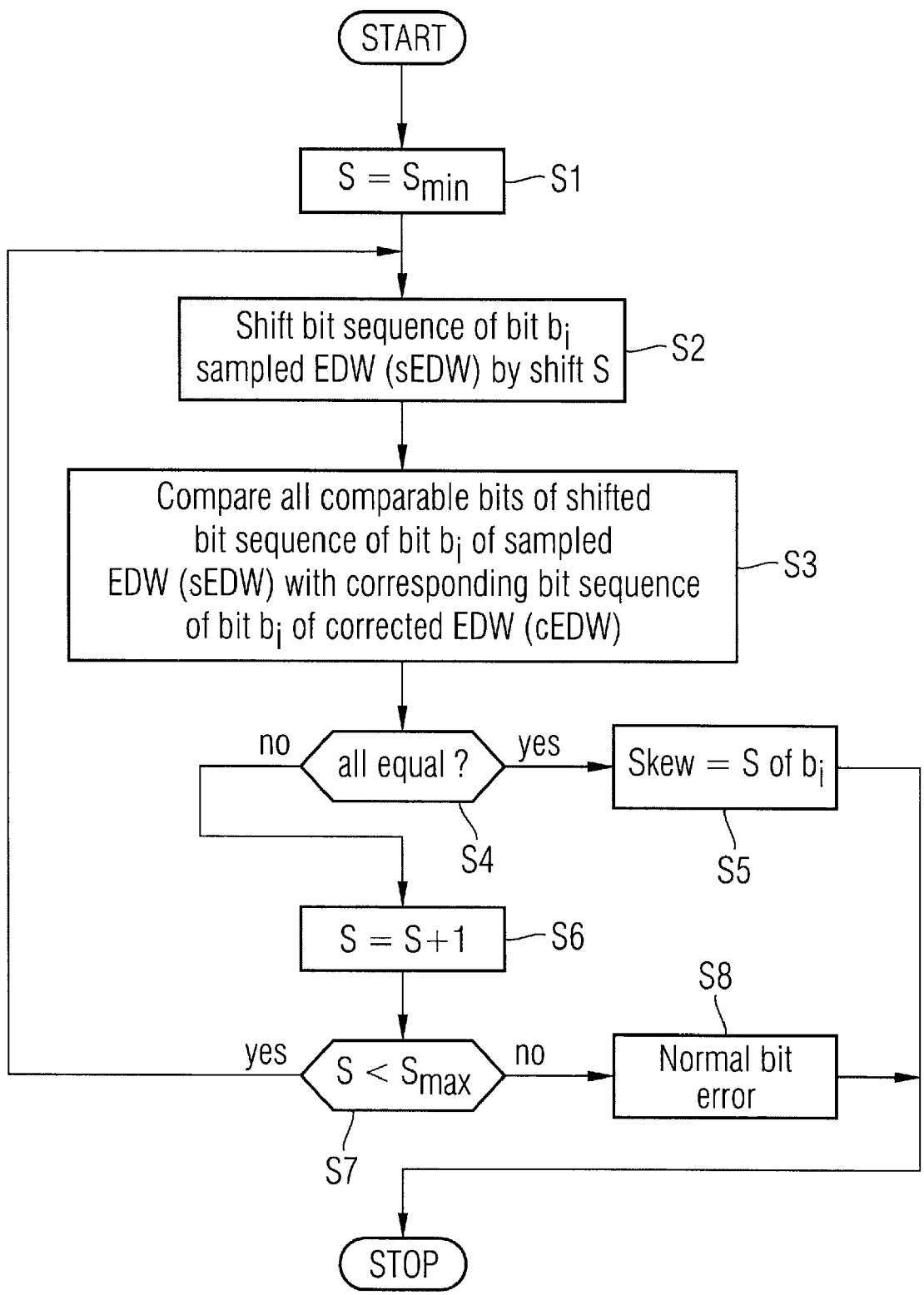
FIG. 9 shows an example for shifting a bit sequence to determine a skew as applied in a possible embodiment of the method according to the present invention.

FIG. 9 shows a flow chart for determining a skew as performed by a possible embodiment of the correlation unit 14.

In a first step S1, the shift value s is set to a minimum shift value Smin. The bit value s indicates the number of shifted clock cycles.

In a further step S2, the bit sequence of a data bit $b_i$ of a sampled encoded data word sequence sEDWs is shifted by the shift value S.

Figure 10:
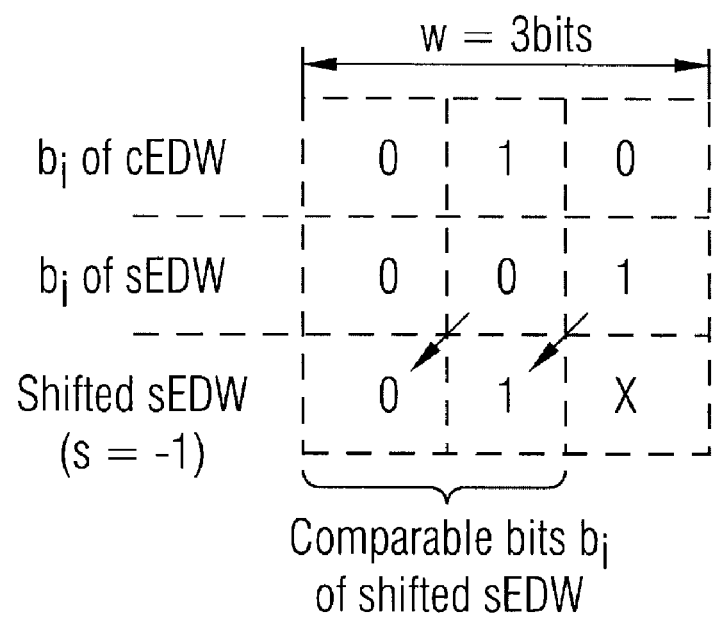
FIG. 10 shows a further flowchart for illustrating a further embodiment of the method for determining a skew according to an embodiment of the present invention.

Then, in a further step S3, a comparator within the correlation unit 14 compares all comparable data bits of the shifted bit sequence of a bit $b_i$ of the sampled encoded data word sequence sEDWs with a corresponding unshifted bit sequence of the data bit $b_i$ of the corrected encoded data word sequence CEDWs. FIG. 10 shows a simple example, wherein the bit sequence which comprises three bits of a data bit $b_i$ is shifted by a shift value s=−1. In the given example of FIG. 10, the sampled encoded data word sEDW is shifted by s=−1 so that only the first two data bits of the shifted encoded data word sEDW can be compared with the corresponding data bits of the unshifted corrected encoded data word cEDW. In the given example of FIG. 10, the shifted sampled encoded data word sEDW matches after the shift operation with the unshifted bit sequence of the corrected encoded data word CEDW. Consequently, it is decided by the correlation unit 14 that the skew of this data bit $b_i$ is s=−1.

As can be seen from the flow chart of FIG. 9, in step S4 it is checked whether a shifted bit sequence matches the unshifted bit sequence for the respective bit $b_i$ and, if there is a complete match, it is decided that the skew of this bit $b_i$ is equal to the shift value S in step S5. If there is no match between the shifted and unshifted sequence, the bit value is incremented in step S6 and it is decided in step S7 whether the shift value s has reached a maximum shift value Smax. If the incremented shift value S has not yet reached the maximum shift value Smax, the process returns to step S2. If the shift value s has reached the maximum shift value Smax, it is decided that no skew error but a normal bit error has occurred in step S8 and the process is stopped. The process as shown in FIG. 9 is performed by the correlation unit 14 for each of the m data bits bi of the encoded data bits EDW. The correlation can be performed by running a program or can be hardwired within the correlation unit 14.

Figure 11:
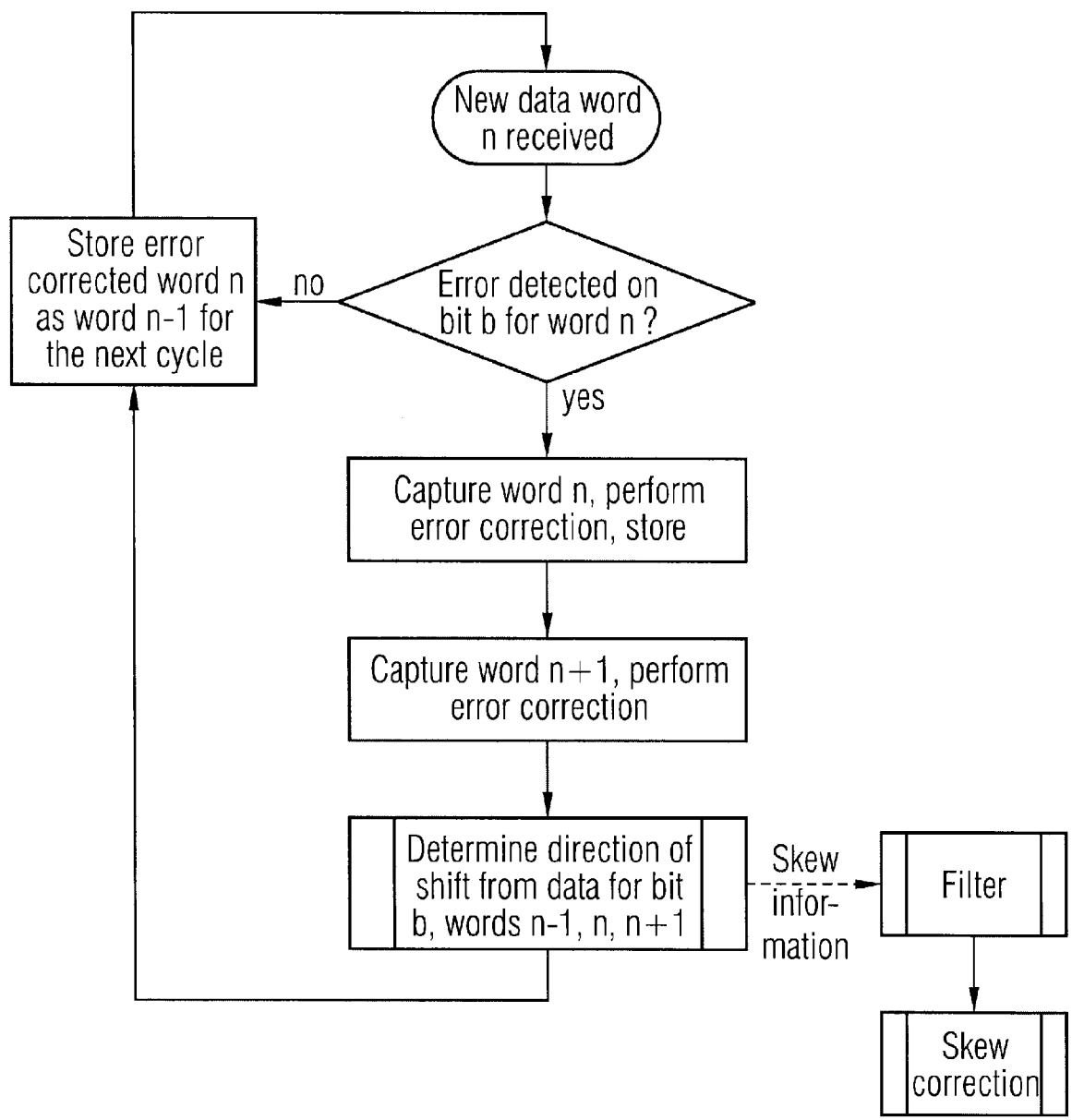
FIG. 11 shows a further flowchart of a further embodiment of a skew measuring algorithm as an embodiment of the method according to the present invention.

FIG. 11 shows a further flowchart of a further embodiment of a skew measuring algorithm as an embodiment of the method according to the present invention. The skew determination algorithm as shown in the flow chart of FIG. 11 is provided for systems with skews bounded to a maximum one word duration. After reception of an encoded data word EDW, the data word of an error free reception is stored so that it is available as a previous data word for a following run of the algorithm. If the error check and correction unit 9 detects an error, the corrected encoded data word cEDW is calculated and stored as word i in a memory. Then, the next encoded data word is received error corrected and stored as data word i+1. After these steps, the corrected data word cEDW i−1 and i+1 are available with the further information that bit b was received wrongly in data word i. By reading bit b of data words i−1, i, i+1 in the table as shown below, the direction of the skew can be obtained:

| Bit i − 1 (CEDW) | Bit i (SEDW) | Bit i (CEDW) | Bit i + 1 (CEDW) | Conclusion |
|---|---|---|---|---|
| 0 | 1 | 0 | 0 | Transmission error, soft error (case 1) |
| 0 | 1 | 0 | 1 | Bit too early, captured next bit (case 3) (Skew S = +1) |
| 0 | 0 | 1 | 0 | No information, if late or early (case 2) |
| 0 | 0 | 1 | 1 | Bit too late, captured previous bit (case 4) (Skew S = −1) |
| 1 | 1 | 0 | 0 | Bit too late, captured previous bit (case 4) |
| 1 | 1 | 0 | 1 | No information, if late or early (case 2) |
| 1 | 0 | 1 | 0 | Bit too early, captured following bit (case 3) |
| 1 | 0 | 1 | 1 | Transmission error, soft error (case 1) |

In the first case (case 1), consecutive bits have the same value and, therefore, a skew cannot cause any wrong reception of the data. Accordingly, it is decided that the reception error has been caused by other error sources.

In the second case (case 2), sampling the previous and the next bit returns the same information and, therefore, no indication is given if the previous or the next bit was sampled.

In case 3 and case 4, the previous and the following bits differ and, therefore, one can determine if the previous or the next bit was captured. This gives a direction for correcting this skew. In case 3 or case 4, information is obtained how to shift the bit to reduce this skew. In all other cases, no information is returned.

After processing the table look-up, the current error corrected encoded data word i is saved as word i−1 for the next loop run as shown in FIG. 11. The same happens if data word i has been received error free and no direction estimation was started. Afterwards, the loop as shown in FIG. 11 is restarted for reception of the next data word. Output information of the table look-up is fed into the filter 15. The filter 15 averages the skew information over multiple runs of the loop as shown in FIG. 11. This ensures that a random transmission or storage errors are not misinterpreted as skew leading to a false skew correction. Only when a sufficient number of calculation results indicate a skew in one direction, corrective actions are taken by controlling the corresponding skew compensation delay units 16 as shown in the embodiments of FIGS. 4, 6. With the method and apparatus according to embodiments of the present invention, an error checking and correction capability for a receiver is used for measuring a skew without the need for a special training data pattern or an extra hardware phase detector.

On data links protected by some kind of error correction technique, information is available which bit of the link has failed, what is the received value and what is the transmit value. By correlating the transmitted (correct) and the shifted versions of the received (wrong) bit sequence an amount and a direction the skew is determined. Corrective measures can then be taken for this bit to reduce its skew into a tolerable skew range. The timing of a single bit is changed, i.e. by adjusting its delay on the transmitting or on the receiving side by adapting a sampling phase for the data bit.

The invention claimed is:

1. A method for determining a skew of each data bit of a stream of encoded data words received by a receiver via a parallel interface from a transmitter comprising the steps of:
   (a) performing an error check and correction for each received and sampled encoded data word to calculate an error corrected encoded data word corresponding to the encoded data word transmitted by the transmitter; and
   (b) correlating the stream of received sampled encoded data words with error corrected encoded data words of current, previous and subsequent data transmissions to determine a skew of each data bit of said received encoded data word stream.

2. The method according to claim 1, wherein the determined skew information is filtered.

3. The method according to claim 1, wherein each bit of the received encoded data word is sampled by a sampling means clocked by a clock signal.

4. The method according to claim 3, wherein the clock signal which is applied to sampling means for sampling a data bit of the received encoded data word is phase shifted depending on the skew determined for the respective data bit.

5. The method according to claim 3, wherein each data bit of the received encoded data word is delayed depending on the skew determined for the respective data bit.

6. The method according to claim 1, wherein a transfer rate at which the encoded data words are transferred from said transmitter via said interface to said receiver is adapted depending on the determined skew.

7. The method according to claim 6, wherein the transfer rate is adapted such that the determined skew is tolerable.

8. The method according to claim 1, wherein the interface is formed by a parallel interface.

9. The method according to claim 1, wherein the interface is formed by a wired interface comprising a signal line for each data bit of the encoded data word.

10. The method according to claim 1,
wherein the interface is formed by a wired or wireless multichannel interface comprising a signal channel for each data bit of said encoded data word.

11. An apparatus for determining a skew of each data bit of a stream of encoded data words received via a parallel interface comprising:
(a) a sampling unit for sampling the received encoded data words;
(b) an error check and correction unit for calculating an error corrected encoded data word for each received encoded data word;
(c) a correlation unit for correlating a sequence of received sampled encoded data words supplied by said sampling unit with error corrected encoded data words of current, previous and subsequent data transmissions to determine a skew for each data bit of the received encoded data word stream.

12. The apparatus according to claim 11,
wherein said sampling unit comprises a register having a clocked sampling circuit each provided for sampling a data bit of the received encoded data word.

13. The apparatus according to claim 11,
wherein a filter is provided for filtering the determined skew of each data bit of the received encoded data word.

14. The apparatus according to claim 12,
comprising skew compensation units each provided for phase shifting of a clock signal for a sampling circuit of said sampling unit provided for sampling a data bit of the received encoded data word depending on a skew determined by said correlation unit for the respective data bit.

15. The apparatus according to claim 11,
comprising skew compensation units each provided for delaying a data bit of the received encoded data word depending on a skew determined by said correlation unit for the respective data bit.

16. The apparatus according to claim 11,
wherein said correlation unit shifts for each data bit of the sampled encoded data word a received bit sequence of said data bit with respect to a corresponding bit sequence of the corresponding data bit of the corrected encoded data word.

17. The apparatus according to claim 16,
wherein the correlation unit determines that a skew error has occurred if the shifted sequence of the data bit of said sampled encoded data word matches the unshifted bit sequence of the corresponding data bit of the corrected encoded data word.

18. The apparatus according to claim 16,
wherein the correlation unit determines the skew to be equal of the applied shift if it is decided that a skew error has occurred.

19. A receiver comprising:
(a) an error check and correction unit for calculating error corrected encoded data words on the basis of sampled encoded data words received by the receiver; and
(b) a correlation unit for correlating a time sequence of received sampled encoded data words supplied by a sampling unit with error corrected encoded data words of current, previous and subsequent data transmissions to determine a skew for each data bit of the received encoded data words.

20. The receiver according to claim 19,
wherein the receiver comprises a skew compensation unit for each data bit.

21. A memory controller comprising a receiver according to claim 19.

22. A memory chip comprising:
(a) an error check and correction unit for calculating error corrected encoded data words on the basis of sampled encoded data words received by said memory chip; and
(b) a correlation unit for correlating a time sequence of received sampled encoded data words supplied by a sampling unit with error corrected encoded data words of current, previous and subsequent data transmissions to determine a skew for each data bit of the received encoded data words.

* * * * *